United States Patent
Costakis et al.

(10) Patent No.: US 9,218,720 B2
(45) Date of Patent: Dec. 22, 2015

(54) BOX OFFICE GAME

(75) Inventors: Alexander Costakis, Los Angeles, CA (US); Jeffrey Hartke, Los Angeles, CA (US); Tzukai Hung, Los Angeles, CA (US)

(73) Assignee: CFPH, LLC, New York, NY (US)

( * ) Notice: Subject to any disclaimer, the term of this patent is extended or adjusted under 35 U.S.C. 154(b) by 903 days.

(21) Appl. No.: 12/104,166

(22) Filed: Apr. 16, 2008

(65) Prior Publication Data

US 2009/0017890 A1 Jan. 15, 2009

Related U.S. Application Data

(60) Provisional application No. 60/912,012, filed on Apr. 16, 2007.

(51) Int. Cl.
| | | |
|---|---|---|
| *A63F 13/00* | (2014.01) | |
| *G07F 17/32* | (2006.01) | |
| *G06Q 10/00* | (2012.01) | |
| *G06Q 50/34* | (2012.01) | |

(52) U.S. Cl.
CPC ............ *G07F 17/3288* (2013.01); *G06Q 10/00* (2013.01); *G06Q 50/34* (2013.01); *G07F 17/32* (2013.01)

(58) Field of Classification Search
CPC ...... G07F 17/3288; G07F 17/32; G06Q 50/34
USPC ........................................................ 705/7.31
See application file for complete search history.

(56) References Cited

U.S. PATENT DOCUMENTS

| | | |
|---|---|---|
| 3,499,646 A | 3/1970 | Burgess, Jr. et al. |
| 3,573,747 A | 4/1971 | Adams et al. |
| 3,581,072 A | 5/1971 | Nymeyer |
| 4,031,376 A | 6/1977 | Corkin, Jr. |
| 4,363,489 A | 12/1982 | Chodak et al. |
| 4,378,942 A | 4/1983 | Isaac |
| 4,412,287 A | 10/1983 | Braddock, III |
| 4,597,046 A | 6/1986 | Musmanno et al. |
| 4,674,044 A | 6/1987 | Kalmus et al. |
| 4,823,265 A | 4/1989 | Nelson |
| 4,874,177 A | 10/1989 | Girardin |
| 4,890,228 A | 12/1989 | Longfield |
| 4,903,201 A | 2/1990 | Wagner |
| 4,918,603 A | 4/1990 | Hughes et al. |
| 4,962,950 A | 10/1990 | Champion |
| 4,980,826 A | 12/1990 | Wagner |

(Continued)

OTHER PUBLICATIONS

SA Mathieson, "High Rollers: An Online Game That Turns Into Reality Is Fantastical. One That Even Makes You Rich Is the Stuff of Dreams" The Guardian, UK, Jan. 23, 2003, p. 8, (Entire Article), available at www.guardian.co.uk/technology/2003/jan/23/games.onlinesupplement1.*

(Continued)

*Primary Examiner* — James S McClellan
*Assistant Examiner* — Syvila Weatherford
(74) *Attorney, Agent, or Firm* — Ruth Ma Swilling

(57) ABSTRACT

In at least one aspect, methods and corresponding systems operable to perform the methods are provided herein that allow multiple players, registered and unregistered, to play a game wherein players submit predictions for box office revenue for a plurality of films and, in certain instances, are awarded points for the proximity of the prediction to actual revenues.

18 Claims, 4 Drawing Sheets

(56) References Cited

U.S. PATENT DOCUMENTS

| | | |
|---|---|---|
| 5,027,102 A | 6/1991 | Sweeny |
| 5,077,665 A | 12/1991 | Silverman et al. |
| 5,101,353 A | 3/1992 | Lupien et al. |
| 5,108,115 A | 4/1992 | Berman et al. |
| 5,136,501 A | 8/1992 | Silverman et al. |
| 5,193,057 A | 3/1993 | Longfield |
| 5,202,827 A | 4/1993 | Sober |
| 5,237,500 A | 8/1993 | Perg et al. |
| 5,270,922 A | 12/1993 | Higgins |
| 5,297,031 A | 3/1994 | Gutterman et al. |
| 5,297,032 A | 3/1994 | Trojan et al. |
| 5,311,423 A | 5/1994 | Clark |
| 5,315,634 A | 5/1994 | Tanaka et al. |
| 5,375,055 A | 12/1994 | Togher et al. |
| 5,489,096 A | 2/1996 | Aron |
| 5,497,317 A | 3/1996 | Hawkins et al. |
| 5,508,731 A | 4/1996 | Kohorn |
| 5,508,913 A | 4/1996 | Yamamoto et al. |
| 5,537,314 A | 7/1996 | Kanter |
| 5,557,517 A | 9/1996 | Daugherty, III |
| 5,573,244 A | 11/1996 | Mindes |
| 5,586,937 A | 12/1996 | Menashe |
| 5,689,652 A | 11/1997 | Lupien et al. |
| 5,692,233 A | 11/1997 | Garman |
| 5,713,793 A | 2/1998 | Holte |
| 5,724,524 A | 3/1998 | Hunt et al. |
| 5,727,165 A | 3/1998 | Ordish et al. |
| 5,743,525 A | 4/1998 | Haddad |
| 5,794,219 A | 8/1998 | Brown |
| 5,799,287 A | 8/1998 | Dembo |
| 5,806,048 A | 9/1998 | Kiron et al. |
| 5,819,237 A | 10/1998 | Garman |
| 5,819,238 A | 10/1998 | Fernholz |
| 5,826,241 A | 10/1998 | Stein et al. |
| 5,842,148 A | 11/1998 | Prendergast et al. |
| 5,842,921 A | 12/1998 | Mindes et al. |
| 5,845,266 A | 12/1998 | Lupien et al. |
| 5,846,132 A | 12/1998 | Junkin |
| 5,888,136 A | 3/1999 | Herbert |
| 5,905,974 A | 5/1999 | Fraser et al. |
| 5,913,203 A | 6/1999 | Wong et al. |
| 5,924,082 A | 7/1999 | Silverman et al. |
| 5,943,678 A | 8/1999 | Hocker et al. |
| 5,946,667 A | 8/1999 | Tull, Jr. et al. |
| 5,950,175 A | 9/1999 | Austin |
| 5,950,176 A | 9/1999 | Keiser et al. |
| 5,950,177 A | 9/1999 | Lupien et al. |
| 5,957,775 A | 9/1999 | Cherry |
| 5,963,921 A | 10/1999 | Longfield |
| 5,970,479 A | 10/1999 | Shepherd |
| 6,004,211 A | 12/1999 | Brenner et al. |
| 6,009,402 A | 12/1999 | Whitworth |
| 6,012,046 A | 1/2000 | Lupien et al. |
| 6,014,643 A | 1/2000 | Minton |
| 6,016,483 A | 1/2000 | Rickard et al. |
| 6,021,397 A | 2/2000 | Jones et al. |
| 6,023,685 A | 2/2000 | Brett et al. |
| 6,024,641 A | 2/2000 | Sarno |
| 6,026,364 A | 2/2000 | Whitworth |
| 6,026,388 A | 2/2000 | Liddy et al. |
| 6,029,146 A | 2/2000 | Hawkins et al. |
| 6,035,287 A | 3/2000 | Stallaert et al. |
| 6,058,377 A | 5/2000 | Traub et al. |
| 6,058,379 A | 5/2000 | Odom et al. |
| 6,064,985 A | 5/2000 | Anderson |
| 6,067,532 A | 5/2000 | Gebb |
| 6,088,685 A | 7/2000 | Kiron |
| 6,092,806 A * | 7/2000 | Follis ........................ 273/138.1 |
| 6,112,189 A | 8/2000 | Rickard et al. |
| 6,113,492 A | 9/2000 | Walker et al. |
| 6,115,698 A | 9/2000 | Tuck et al. |
| 6,120,376 A | 9/2000 | Cherry |
| 6,126,543 A | 10/2000 | Friedman |
| 6,152,822 A | 11/2000 | Herbert |
| 6,154,730 A | 11/2000 | Adams et al. |
| 6,161,096 A | 12/2000 | Bell |
| 6,202,052 B1 | 3/2001 | Miller |
| 6,236,900 B1 | 5/2001 | Geiger |
| 6,236,972 B1 | 5/2001 | Shkedy |
| 6,240,396 B1 | 5/2001 | Walker et al. |
| 6,260,019 B1 | 7/2001 | Courts |
| 6,260,024 B1 | 7/2001 | Shkedy |
| 6,263,201 B1 | 7/2001 | Hashimoto et al. |
| 6,263,321 B1 | 7/2001 | Daughtery, III |
| 6,278,981 B1 | 8/2001 | Dembo et al. |
| 6,287,199 B1 | 9/2001 | McKeown et al. |
| 6,293,865 B1 * | 9/2001 | Kelly et al. ..................... 463/16 |
| 6,296,569 B1 | 10/2001 | Congello, Jr. |
| 6,309,307 B1 | 10/2001 | Krause et al. |
| 6,325,721 B1 | 12/2001 | Miyamoto et al. |
| 6,331,148 B1 | 12/2001 | Krause et al. |
| 6,347,086 B1 | 2/2002 | Strachan |
| 6,358,150 B1 | 3/2002 | Mir et al. |
| 6,360,210 B1 | 3/2002 | Wallman |
| 6,371,855 B1 | 4/2002 | Gavriloff |
| 6,418,417 B1 | 7/2002 | Corby et al. |
| 6,443,841 B1 | 9/2002 | Rossides |
| 6,450,887 B1 | 9/2002 | Mir et al. |
| 6,470,324 B1 | 10/2002 | Brown et al. |
| 6,473,084 B1 * | 10/2002 | Phillips et al. ................. 345/440 |
| 6,482,091 B1 | 11/2002 | Kobayashi et al. |
| 6,505,174 B1 | 1/2003 | Keiser et al. |
| 6,527,270 B2 | 3/2003 | Maksymec et al. |
| 6,578,010 B1 | 6/2003 | Teacherson |
| 6,598,028 B1 | 7/2003 | Sullivan et al. |
| 6,604,239 B1 | 8/2003 | Kohen |
| 6,618,858 B1 | 9/2003 | Gautier |
| 6,629,082 B1 | 9/2003 | Hambrecht et al. |
| 6,669,565 B2 | 12/2003 | Liegey |
| 6,688,978 B1 | 2/2004 | Herman |
| 6,692,916 B2 | 2/2004 | Bevilacqua et al. |
| 6,697,787 B1 | 2/2004 | Miller |
| 6,711,550 B1 | 3/2004 | Lewis et al. |
| 6,772,132 B1 | 8/2004 | Kemp et al. |
| 6,792,411 B1 | 9/2004 | Massey, Jr. |
| 6,837,791 B1 | 1/2005 | McNutt et al. |
| 6,910,965 B2 | 6/2005 | Downes |
| 6,925,446 B2 | 8/2005 | Watanabe |
| 6,939,137 B1 | 9/2005 | Colaio et al. |
| 7,001,279 B1 | 2/2006 | Barber et al. |
| 7,003,485 B1 | 2/2006 | Young |
| 7,006,991 B2 | 2/2006 | Keiser et al. |
| 7,016,873 B1 | 3/2006 | Peterson et al. |
| 7,031,938 B2 | 4/2006 | Fraivillig et al. |
| 7,062,457 B1 | 6/2006 | Kaufman |
| 7,076,459 B2 | 7/2006 | Zhang et al. |
| 7,099,838 B1 | 8/2006 | Gastineau et al. |
| 7,099,839 B2 | 8/2006 | Madoff et al. |
| 7,110,961 B1 | 9/2006 | Goino |
| 7,120,928 B2 | 10/2006 | Sheth et al. |
| 7,124,106 B1 | 10/2006 | Stallaert et al. |
| 7,127,425 B1 | 10/2006 | Wilson |
| 7,131,574 B1 | 11/2006 | Sciupac et al. |
| 7,146,334 B2 | 12/2006 | Hogg et al. |
| 7,152,041 B2 | 12/2006 | Salavadori et al. |
| 7,158,950 B2 | 1/2007 | Snyder |
| 7,162,447 B1 | 1/2007 | Cushing |
| 7,171,385 B1 | 1/2007 | Dembo et al. |
| 7,171,386 B1 | 1/2007 | Raykhman |
| 7,172,508 B2 | 2/2007 | Simon et al. |
| 7,174,517 B2 | 2/2007 | Barnett et al. |
| 7,177,829 B1 | 2/2007 | Wilson et al. |
| 7,201,653 B2 | 4/2007 | Radom |
| 7,219,071 B2 | 5/2007 | Gallagher |
| 7,233,922 B2 | 6/2007 | Asher et al. |
| 7,236,955 B2 | 6/2007 | Sugahara |
| 7,249,081 B2 | 7/2007 | Shearer et al. |
| 7,263,504 B2 | 8/2007 | Galai et al. |
| 7,321,871 B2 | 1/2008 | Scott et al. |
| 7,340,425 B2 | 3/2008 | Boyle et al. |
| 7,341,517 B2 | 3/2008 | Asher et al. |
| 7,359,871 B1 | 4/2008 | Paasche et al. |
| 7,389,262 B1 | 6/2008 | Lange |
| 7,389,268 B1 | 6/2008 | Kemp et al. |

(56) References Cited

U.S. PATENT DOCUMENTS

| | | |
|---|---|---|
| 7,395,232 B1 | 7/2008 | Pilato |
| 7,409,367 B2 | 8/2008 | McGill et al. |
| 7,437,304 B2 | 10/2008 | Barnard et al. |
| 7,438,640 B2 | 10/2008 | Amour |
| 7,451,104 B1 | 11/2008 | Hendrix |
| 7,487,123 B1 | 2/2009 | Keiser et al. |
| 7,509,290 B1 * | 3/2009 | McKee et al. ............... 705/56 |
| 7,536,327 B2 | 5/2009 | Griebel et al. |
| 7,567,931 B2 | 7/2009 | Asher et al. |
| 7,567,935 B2 | 7/2009 | Tell et al. |
| 7,571,130 B2 | 8/2009 | Weber et al. |
| 7,641,549 B2 | 1/2010 | Asher et al. |
| 7,690,991 B2 | 4/2010 | Black |
| 7,698,184 B2 | 4/2010 | Asher et al. |
| 7,742,972 B2 | 6/2010 | Lange et al. |
| 7,818,225 B2 | 10/2010 | Gula |
| 7,844,514 B2 | 11/2010 | Blasnik et al. |
| 7,896,740 B2 | 3/2011 | Asher et al. |
| 7,908,323 B2 | 3/2011 | Lim |
| 7,918,392 B2 | 4/2011 | Beck et al. |
| 7,962,400 B2 | 6/2011 | Amaitis et al. |
| 7,996,296 B2 | 8/2011 | Lange |
| 8,027,899 B2 | 9/2011 | Asher et al. |
| 8,065,219 B2 | 11/2011 | Haynie et al. |
| 8,337,310 B1 * | 12/2012 | Bjordahl et al. ............. 463/42 |
| 8,364,571 B1 | 1/2013 | Sroka et al. |
| 8,504,454 B2 | 8/2013 | Asher et al. |
| 8,756,142 B1 | 6/2014 | Keiser et al. |
| 2001/0003099 A1 | 6/2001 | Von Kohorn |
| 2001/0029485 A1 | 10/2001 | Brody et al. |
| 2001/0031656 A1 | 10/2001 | Marshall et al. |
| 2001/0034268 A1 | 10/2001 | Thomas et al. |
| 2001/0037211 A1 | 11/2001 | McNutt et al. |
| 2001/0037268 A1 | 11/2001 | Miller |
| 2001/0039209 A1 | 11/2001 | DeWeese et al. |
| 2001/0042785 A1 | 11/2001 | Walker et al. |
| 2001/0047291 A1 | 11/2001 | Garahi et al. |
| 2001/0047295 A1 | 11/2001 | Tenembaum |
| 2002/0013747 A1 | 1/2002 | Valentine et al. |
| 2002/0019792 A1 | 2/2002 | Maerz et al. |
| 2002/0023035 A1 | 2/2002 | Kiron et al. |
| 2002/0023037 A1 | 2/2002 | White |
| 2002/0026390 A1 | 2/2002 | Ulenas et al. |
| 2002/0032641 A1 | 3/2002 | Mendiola et al. |
| 2002/0038270 A1 | 3/2002 | Shin et al. |
| 2002/0046109 A1 | 4/2002 | Leonard et al. |
| 2002/0052816 A1 | 5/2002 | Clenaghan et al. |
| 2002/0055089 A1 | 5/2002 | Scheirer |
| 2002/0062243 A1 | 5/2002 | Anderson |
| 2002/0062281 A1 | 5/2002 | Singhal |
| 2002/0065666 A1 | 5/2002 | Zorrila De San Martin Soto |
| 2002/0068633 A1 | 6/2002 | Schlaifer |
| 2002/0073021 A1 | 6/2002 | Ginsberg et al. |
| 2002/0076674 A1 | 6/2002 | Kaplan |
| 2002/0077880 A1 | 6/2002 | Gordon et al. |
| 2002/0077961 A1 | 6/2002 | Eckert et al. |
| 2002/0082965 A1 | 6/2002 | Loeper |
| 2002/0082969 A1 | 6/2002 | O'Keeffe et al. |
| 2002/0087373 A1 | 7/2002 | Dickstein et al. |
| 2002/0087447 A1 | 7/2002 | McDonald et al. |
| 2002/0087454 A1 | 7/2002 | Calo et al. |
| 2002/0094869 A1 | 7/2002 | Harkham |
| 2002/0095369 A1 | 7/2002 | Kaplan et al. |
| 2002/0099640 A1 | 7/2002 | Lange |
| 2002/0103738 A1 | 8/2002 | Griebel et al. |
| 2002/0107599 A1 | 8/2002 | Patel et al. |
| 2002/0111946 A1 | 8/2002 | Fallon |
| 2002/0112014 A1 | 8/2002 | Bennett et al. |
| 2002/0115488 A1 | 8/2002 | Berry et al. |
| 2002/0119793 A1 | 8/2002 | Hronek et al. |
| 2002/0120490 A1 | 8/2002 | Gajewski et al. |
| 2002/0128951 A1 | 9/2002 | Kiron et al. |
| 2002/0133410 A1 | 9/2002 | Hermreck et al. |
| 2002/0142842 A1 * | 10/2002 | Easley et al. ............... 463/42 |
| 2002/0143676 A1 | 10/2002 | Kiron et al. |
| 2002/0147670 A1 | 10/2002 | Lange |
| 2002/0152458 A1 | 10/2002 | Eyer et al. |
| 2002/0153656 A1 | 10/2002 | Maksymec et al. |
| 2002/0155884 A1 * | 10/2002 | Updike ............... 463/25 |
| 2002/0156709 A1 | 10/2002 | Andrus et al. |
| 2002/0156715 A1 | 10/2002 | Wall et al. |
| 2002/0161622 A1 | 10/2002 | Zhang et al. |
| 2002/0165740 A1 | 11/2002 | Saunders |
| 2002/0188555 A1 | 12/2002 | Lawrence |
| 2002/0194097 A1 | 12/2002 | Reitz |
| 2002/0194502 A1 | 12/2002 | Sheth et al. |
| 2003/0008711 A1 | 1/2003 | Corbo |
| 2003/0009415 A1 | 1/2003 | Lutnick et al. |
| 2003/0018564 A1 | 1/2003 | Bonnier et al. |
| 2003/0018571 A1 | 1/2003 | Eckert et al. |
| 2003/0022719 A1 | 1/2003 | Donald et al. |
| 2003/0024988 A1 | 2/2003 | Stanard |
| 2003/0036395 A1 | 2/2003 | Proidi |
| 2003/0036396 A1 | 2/2003 | Back et al. |
| 2003/0061096 A1 | 3/2003 | Gallivan et al. |
| 2003/0065615 A1 | 4/2003 | Aschir |
| 2003/0093356 A1 | 5/2003 | Kaufman |
| 2003/0101128 A1 | 5/2003 | Abernethy |
| 2003/0115128 A1 | 6/2003 | Lange et al. |
| 2003/0130920 A1 | 7/2003 | Freund |
| 2003/0130941 A1 | 7/2003 | Birle |
| 2003/0144054 A1 | 7/2003 | DeWeese et al. |
| 2003/0144057 A1 | 7/2003 | Brenner et al. |
| 2003/0154092 A1 | 8/2003 | Bouron et al. |
| 2003/0157976 A1 | 8/2003 | Simon et al. |
| 2003/0171980 A1 | 9/2003 | Keiser et al. |
| 2003/0172026 A1 | 9/2003 | Tarrant |
| 2003/0177055 A1 | 9/2003 | Zimmerman, Jr. et al. |
| 2003/0195841 A1 | 10/2003 | Ginsberg et al. |
| 2003/0199315 A1 | 10/2003 | Downes P.E. |
| 2003/0200164 A1 | 10/2003 | Jacobs |
| 2003/0204408 A1 | 10/2003 | Guler et al. |
| 2003/0212623 A1 | 11/2003 | Aylmer et al. |
| 2003/0236734 A1 | 12/2003 | Guler et al. |
| 2003/0236738 A1 | 12/2003 | Lange et al. |
| 2004/0002369 A1 * | 1/2004 | Walker et al. ............... 463/1 |
| 2004/0015427 A1 | 1/2004 | Camelio |
| 2004/0039685 A1 | 2/2004 | Hambrecht et al. |
| 2004/0043810 A1 | 3/2004 | Perlin et al. |
| 2004/0049447 A1 | 3/2004 | Keiser et al. |
| 2004/0058731 A1 | 3/2004 | Rossides |
| 2004/0059646 A1 | 3/2004 | Harrington et al. |
| 2004/0059660 A1 | 3/2004 | Michael |
| 2004/0068738 A1 | 4/2004 | Kinoshita |
| 2004/0078268 A1 | 4/2004 | Sprogis |
| 2004/0078314 A1 | 4/2004 | Maerz et al. |
| 2004/0088242 A1 | 5/2004 | Asher et al. |
| 2004/0088244 A1 | 5/2004 | Bartter et al. |
| 2004/0110552 A1 | 6/2004 | Del Prado |
| 2004/0111358 A1 | 6/2004 | Lange et al. |
| 2004/0117302 A1 | 6/2004 | Weichert et al. |
| 2004/0138977 A1 | 7/2004 | Tomkins et al. |
| 2004/0143530 A1 | 7/2004 | Galai et al. |
| 2004/0148236 A1 | 7/2004 | Steidlmayer |
| 2004/0148244 A1 | 7/2004 | Badeau et al. |
| 2004/0153375 A1 | 8/2004 | Mukunya et al. |
| 2004/0171381 A1 | 9/2004 | Inselberg |
| 2004/0192437 A1 | 9/2004 | Amaitis et al. |
| 2004/0193469 A1 | 9/2004 | Amaitis et al. |
| 2004/0193531 A1 | 9/2004 | Amaitis et al. |
| 2004/0199450 A1 | 10/2004 | Johnston et al. |
| 2004/0199451 A1 | 10/2004 | Benning et al. |
| 2004/0199459 A1 | 10/2004 | Johnston et al. |
| 2004/0199471 A1 | 10/2004 | Hardjono |
| 2004/0204245 A1 | 10/2004 | Amaitis et al. |
| 2004/0210507 A1 | 10/2004 | Asher et al. |
| 2004/0225554 A1 | 11/2004 | Chiappetta et al. |
| 2004/0229671 A1 | 11/2004 | Stronach et al. |
| 2004/0235542 A1 | 11/2004 | Stronach et al. |
| 2004/0235561 A1 | 11/2004 | Marshall et al. |
| 2004/0243504 A1 | 12/2004 | Asher et al. |
| 2004/0248637 A1 | 12/2004 | Liebenberg et al. |
| 2004/0260575 A1 | 12/2004 | Massey, Jr. |
| 2004/0267657 A1 | 12/2004 | Hecht |

(56) References Cited

U.S. PATENT DOCUMENTS

| | | |
|---|---|---|
| 2005/0010487 A1 | 1/2005 | Weisbach et al. |
| 2005/0021441 A1 | 1/2005 | Flake et al. |
| 2005/0021445 A1 | 1/2005 | Caro |
| 2005/0027583 A1 | 2/2005 | Smit et al. |
| 2005/0027643 A1 | 2/2005 | Amaitis et al. |
| 2005/0038706 A1 | 2/2005 | Yazdani et al. |
| 2005/0044025 A1 | 2/2005 | Tutty et al. |
| 2005/0049731 A1 | 3/2005 | Dell |
| 2005/0055302 A1 | 3/2005 | Wenger et al. |
| 2005/0064937 A1 | 3/2005 | Ballman |
| 2005/0070251 A1 | 3/2005 | Satake et al. |
| 2005/0071250 A1 | 3/2005 | Weisbach et al. |
| 2005/0080705 A1 | 4/2005 | Chaganti |
| 2005/0086147 A1 | 4/2005 | Woodruff et al. |
| 2005/0097022 A1 | 5/2005 | Silman |
| 2005/0102215 A1 | 5/2005 | Ausubel et al. |
| 2005/0108131 A1 | 5/2005 | Halikias |
| 2005/0125333 A1 | 6/2005 | Giannetti |
| 2005/0154629 A1 | 7/2005 | Matsuda et al. |
| 2005/0160020 A1 | 7/2005 | Asher et al. |
| 2005/0160024 A1 | 7/2005 | Soderborg et al. |
| 2005/0160028 A1 | 7/2005 | Asher et al. |
| 2005/0160029 A1 | 7/2005 | Asher et al. |
| 2005/0181862 A1* | 8/2005 | Asher et al. ................. 463/25 |
| 2005/0187020 A1* | 8/2005 | Amaitis et al. .............. 463/42 |
| 2005/0187866 A1 | 8/2005 | Lee |
| 2005/0208996 A1 | 9/2005 | Friedman |
| 2005/0209954 A1 | 9/2005 | Asher et al. |
| 2005/0218218 A1 | 10/2005 | Koster |
| 2005/0267836 A1 | 12/2005 | Crosthwaite et al. |
| 2006/0003830 A1 | 1/2006 | Walker et al. |
| 2006/0004584 A1 | 1/2006 | Knight |
| 2006/0025208 A1 | 2/2006 | Ramsey |
| 2006/0026091 A1 | 2/2006 | Keen, Jr. et al. |
| 2006/0036448 A1 | 2/2006 | Haynie et al. |
| 2006/0040717 A1* | 2/2006 | Lind et al. .................. 463/7 |
| 2006/0069635 A1 | 3/2006 | Ram et al. |
| 2006/0080220 A1 | 4/2006 | Samuel et al. |
| 2006/0085320 A1 | 4/2006 | Owens et al. |
| 2006/0100006 A1 | 5/2006 | Mitchell et al. |
| 2006/0105840 A1 | 5/2006 | Graeve |
| 2006/0116950 A1 | 6/2006 | Poffenberger et al. |
| 2006/0123092 A1 | 6/2006 | Madams et al. |
| 2006/0143099 A1 | 6/2006 | Partlow et al. |
| 2006/0143110 A1 | 6/2006 | Keiser et al. |
| 2006/0173761 A1 | 8/2006 | Costakis |
| 2006/0173764 A1 | 8/2006 | Costakis et al. |
| 2006/0195355 A1 | 8/2006 | Lundgren |
| 2006/0235783 A1 | 10/2006 | Ryles et al. |
| 2006/0240852 A1 | 10/2006 | Al-Sarawi |
| 2006/0258429 A1 | 11/2006 | Manning et al. |
| 2006/0259312 A1 | 11/2006 | DeTitta |
| 2006/0259381 A1 | 11/2006 | Gershon |
| 2006/0277135 A1 | 12/2006 | Jain et al. |
| 2006/0293985 A1 | 12/2006 | Lederman et al. |
| 2006/0293995 A1 | 12/2006 | Borgs et al. |
| 2007/0010314 A1 | 1/2007 | Tulley et al. |
| 2007/0011073 A1* | 1/2007 | Gardner et al. ................. 705/35 |
| 2007/0054718 A1 | 3/2007 | Del Prado |
| 2007/0060380 A1 | 3/2007 | McMonigle et al. |
| 2007/0061240 A1 | 3/2007 | Jain et al. |
| 2007/0073608 A1 | 3/2007 | Garcia |
| 2007/0087815 A1 | 4/2007 | Van Luchene |
| 2007/0087816 A1 | 4/2007 | Van Luchene |
| 2007/0088661 A1 | 4/2007 | De Verdier et al. |
| 2007/0100729 A1 | 5/2007 | Chen |
| 2007/0130040 A1 | 6/2007 | Stinski |
| 2007/0136074 A1 | 6/2007 | Hahn et al. |
| 2007/0156594 A1 | 7/2007 | McGucken |
| 2007/0168268 A1 | 7/2007 | Lange et al. |
| 2007/0174171 A1 | 7/2007 | Sheffield |
| 2007/0207849 A1 | 9/2007 | Asher et al. |
| 2007/0208642 A1 | 9/2007 | Asher et al. |
| 2007/0225069 A1 | 9/2007 | Garahi et al. |
| 2007/0255965 A1 | 11/2007 | McGucken |
| 2007/0281770 A1* | 12/2007 | Marcus ............................ 463/9 |
| 2007/0298871 A1 | 12/2007 | Asher et al. |
| 2008/0015023 A1* | 1/2008 | Walker et al. .................. 463/42 |
| 2008/0015969 A1 | 1/2008 | Mowshowitz |
| 2008/0026825 A1 | 1/2008 | Yoshioka |
| 2008/0032786 A1 | 2/2008 | Hosokawa |
| 2008/0088087 A1 | 4/2008 | Weitzman et al. |
| 2008/0153579 A1 | 6/2008 | Brenner et al. |
| 2008/0183611 A1 | 7/2008 | Frischer |
| 2008/0195459 A1 | 8/2008 | Stinski |
| 2008/0200242 A1 | 8/2008 | Ginsberg et al. |
| 2008/0207297 A1 | 8/2008 | Zilba |
| 2008/0275824 A1 | 11/2008 | Assia et al. |
| 2009/0017905 A1 | 1/2009 | Meckenzie et al. |
| 2009/0061995 A1 | 3/2009 | Assia et al. |
| 2009/0062016 A1 | 3/2009 | Assia et al. |
| 2009/0186689 A1 | 7/2009 | Hughes et al. |
| 2009/0210335 A1 | 8/2009 | Asher et al. |
| 2009/0247286 A1 | 10/2009 | Inamura |
| 2010/0153256 A1 | 6/2010 | Asher et al. |
| 2010/0160012 A1 | 6/2010 | Amaitis et al. |
| 2010/0173697 A1 | 7/2010 | Van Luchene |
| 2010/0197382 A1 | 8/2010 | Van Luchene |
| 2010/0210335 A1 | 8/2010 | Goto et al. |
| 2010/0216545 A1 | 8/2010 | Lange et al. |
| 2011/0208633 A1 | 8/2011 | Asher et al. |
| 2013/0157755 A1 | 6/2013 | Amaitis |
| 2013/0204764 A1 | 8/2013 | Sroka et al. |
| 2013/0282551 A1 | 10/2013 | Keiser |
| 2014/0067643 A1 | 3/2014 | Asher et al. |
| 2015/0031423 A1 | 1/2015 | Amaitis et al. |

OTHER PUBLICATIONS

Dong, et al. "Box Office Revenue Prediction", Mas 921: proseminar; http://web.media.mit.edu/~nustariz/proseminar/proseminar_2006. html, [http://web.media.mit.edu/~nustariz/proseminar/virtual_markets.ppt#273,7,] Dec. 12, 2006, pp. 1-13.

Small, "Box Office Bull's Eye: Another Winner!", http://popwatch.ew.com/popwatch/2005/12/box_office_bull_2.html#more, Dec. 19, 2005.

* cited by examiner

BOX OFFICE GAME

This application claims the benefit of U.S. Provisional Application No. 60/912,012, filed Apr. 16, 2007, which is hereby incorporated herein by reference.

BACKGROUND

The present application relates to games, playable among a plurality of players each attempting to achieve a greater score than another of the players.

SUMMARY

In at least one aspect, methods and corresponding systems operable to perform the methods are provided that include the step or steps of: receiving from a computing device associated with an unregistered player a prediction for a variable associated with each of a plurality of films; generating a unique identifier automatically for the unregistered player; causing a data file to be stored on the computing device associated with the unregistered player, the data file comprising the unique identifier for the unregistered player; retrieving a result of the predictions for the unregistered player based on the unique identifier stored in the data file; communicating the results to the unregistered player; receiving from a computing device associated with a registered player a prediction for a variable associated with each of a plurality of films; retrieving a result of the predictions for the registered player based on a unique identifier set by the registered player; and communicating the results to the registered player. Various variables may be predicted, such as box office revenue for the film for an amount of time, such as opening weekend or the weekend following opening weekend.

In at least one embodiment, the method further comprises communicating a list of a plurality of new releases and wherein the predictions from the unregistered and registered players are for each of the plurality of new releases. The list may further include at least one holdover and wherein the predictions from the unregistered and registered players are further for the at least one holdover.

In at least one embodiment, the method further comprises determining a score for the registered player based on the results of the predictions for the registered player, wherein the score is computed based on sum of at least a first score applied to predictions within a first range of an actual value of the variable and a second score applied to predictions within a second range of the actual value of the variable.

In at least one embodiment, the method further comprises causing an interface screen to be displayed at the computing device associated with the unregistered and registered users, the interface screen comprising a listing of films and a form element adjacent to each of the films for the players to specify their predictions.

In at least one embodiment, the method further comprises determining an average of predictions of a plurality of players and communicating the average to at least one of the unregistered and the registered players.

In at least one embodiment, the method further comprises communicating only to registered players a leader board comprising a listing of other registered players having a best score for a period of time.

DETAILED DESCRIPTION OF THE INVENTION

Figure 1:
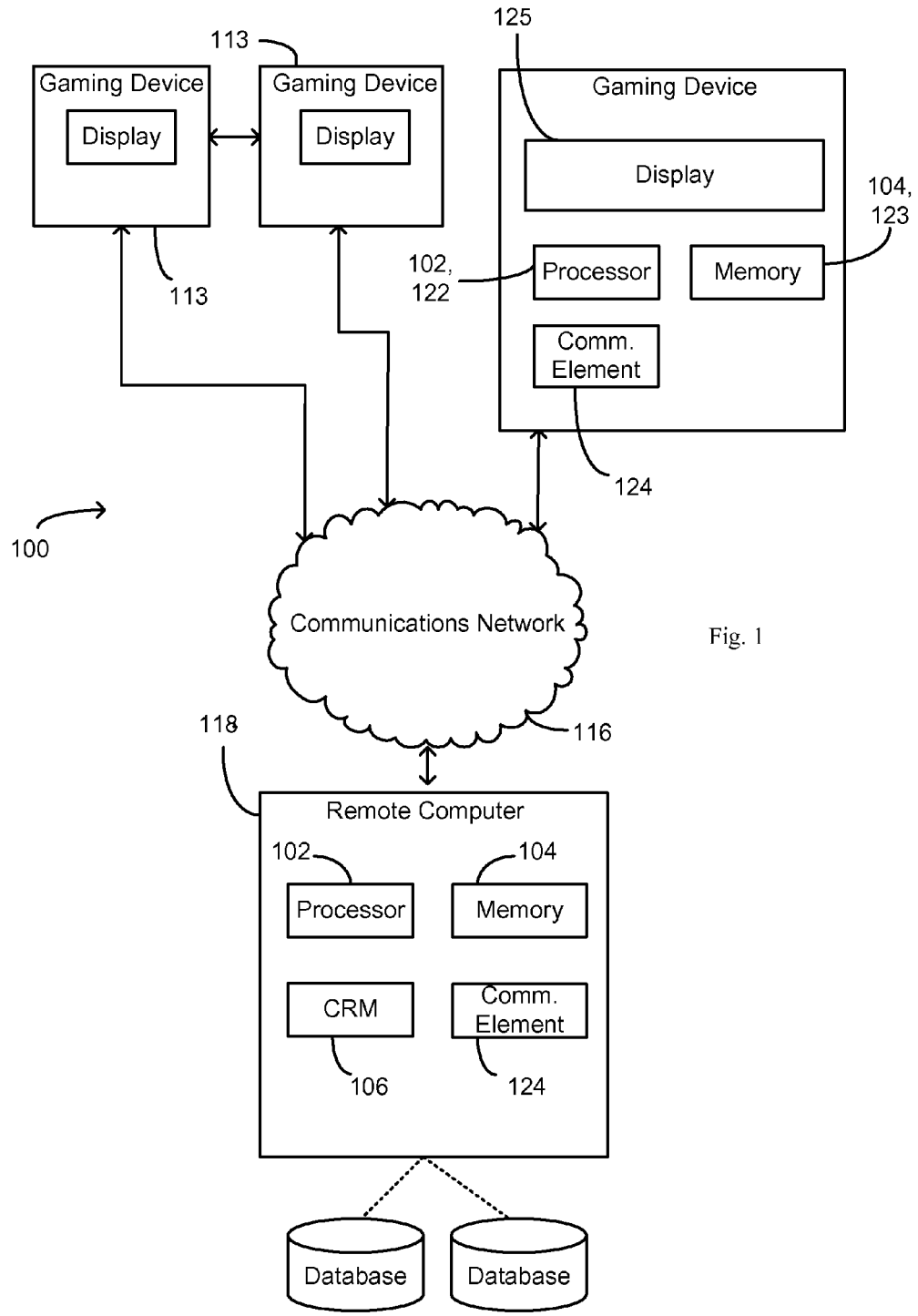
FIG. 1 depicts a system according to at least one embodiment of the systems disclosed herein.

Referring to FIG. 1, a system 100 according to at least one embodiment of the systems disclosed herein includes at least one computing device, such as a remote computer 118, e.g., a server computer, a client device 113, or a combination thereof. The computing device generally includes at least one processor 102, and a memory 104, such as ROM, RAM, FLASH, etc., or any computer readable medium 106, such as a hard drive, a flash-drive, an optical or magnetic disk, etc. The memory 104 or computer readable medium 106 preferably includes software stored thereon that when executed performs one or more steps of the methods disclosed herein, including communicating data back and forth between devices, displaying interface screens, etc. The computing device may also be associated with or have access to one or more databases for retrieving and storing the various types of data discussed herein.

In one embodiment, the system 100 includes a plurality of computing device, such as a remote computer 118 coupled to at least one client device 113 over a communication network 116, which are generally configured or otherwise capable of transmitting and/or receiving communications to and/or from each other. The term remote in this context merely means that the remote computer 118 and the client device 113 are separate from each other. Thus, the devices may be remote even if the devices are located within the same room. As such, the client device 113 is preferably configured or otherwise capable of transmitting and/or receiving communications to and/or from the remote computer 118. This may be accomplished with a communication element 124, such as a modem, an Ethernet interface, a transmitter/receiver, etc., that enables communication with a similarly equipped remote computer 118, wirelessly, wired, or a combination thereof. It is understood that the relative functionality described herein may be provided by the remote computer 118, by the client device 113, or both, and is thus not limited to any one implementation discussed herein.

The client devices 113 may include, without limitation, a mobile phone, PDA, pocket PC, personal computer, as well as any special or general purpose client device, such as a slot machine, a video poker machine, video or computer-based versions of table games, e.g., roulette, blackjack, etc. As such, the client device 113 preferably includes a processor 122, a memory 123, a display 125, such as a CRT or an LCD monitor, for displaying information and/or graphics associated with the services provided by the system 100, and at least one input device, such as a mouse, a touch-sensitive pad, a pointer, a stylus, a trackball, a button, e.g., alphanumeric, a scroll wheel, a touch-sensitive monitor, etc., or a combination thereof, for users to enter commands and/or information relevant to the system's services. With the general purpose type client devices 113, such as the PC or PDA, users may access the services provided by the system 100, e.g., the remote computer 118, with a browser or any other generic application, or with special purpose software designed specifically for accessing and providing the services disclosed herein.

In at least one embodiment, the system 100 provides one or more levels of service. In a first level, a base-level, players are not required to register in order to participate in gameplay. In the base-level, the service may include the ability for the base-level user to play the game (e.g., entering a box office prediction) and to view the results of previous play(s) (e.g., the results of previous predictions, such as a previous week's predictions). Those who want to take advantage of the full game-experience, including reviewing related content, appearing on the Leader Board, or win prizes will need to register and select a unique username.

In at least one embodiment, the system 100 allows users to play a box office game in which, players submit predictions for a value of variable associated with a film achieving a certain level at a later time. For example, each week players may have the opportunity to submit weekend box office estimates for a selected group of a plurality of, e.g., five, films representing new releases for the upcoming weekend and/or major holdovers. Players preferably earn points when their estimates come close to the actual value of the variable at the later time. The closer the estimate to the actual, the greater the amount of points may be awarded. For example, predictions may be awarded 1 point if they are within 25%, 2 points if they are within 10%, and 3 points if they hit the nail on the head, i.e., the prediction is essentially equal to the actual value of the variable.

For example, if the actual weekend box office is:

| | |
|---|---|
| Charlotte's Web | $55,600,000 |
| Eragon | $17,300,000 |
| Night at the Museum | $62,900,000 |
| Rocky Balboa | $18,400,000 |
| We are Marshall | $24,700,000 |

Then:

| Trader A | |
|---|---|
| Charlotte's Web | $66,100,000 |
| Eragon | $26,200,000 |
| Night at the Museum | $76,000,000 |
| Rocky Balboa | $9,200,000 |
| We are Marshall | $24,700,000 |

| Trader B | |
|---|---|
| Charlotte's Web | $55,000,000 |
| Eragon | $18,400,000 |
| Night at the Museum | $61,200,000 |
| Rocky Balboa | $28,100,000 |
| We are Marshall | $20,600,000 |

In this instance, Trade A earns 5 points for his/her predictions, 3 for We Are Marshall, and 1 each for Charlotte's Web and Night of the Museum, and Trader B earns 7 points, 2 each for Charlotte's Web, Eragon, and Night of the Museum, and 1 for We Are Marshall.

Figure 2:
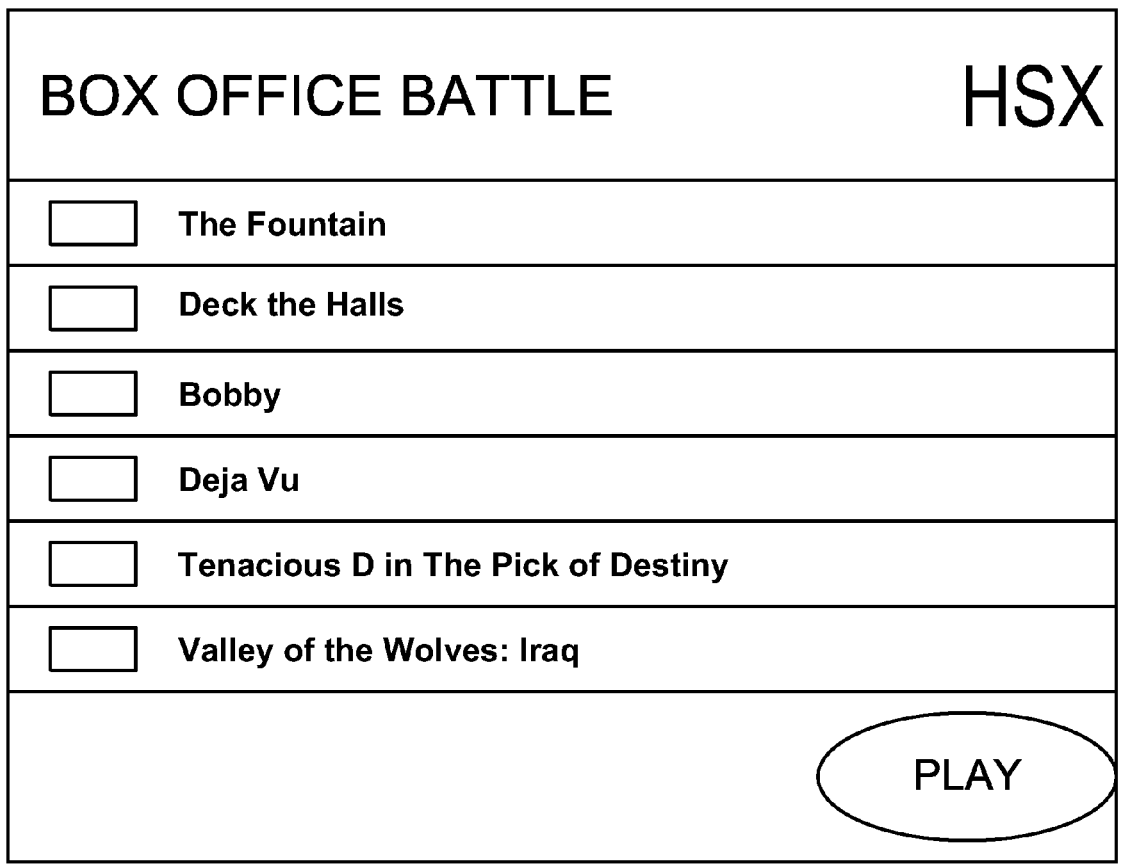
FIGS. 2-4 depict a plurality of interfaces according to at least one embodiment of the methods and systems disclosed herein.

In one embodiment, players may enter their estimates of the upcoming weekend's box office for the selected films in an interface screen that includes a listing of the selected films and a box or other form element to the left or otherwise adjacent to each listed title, as shown in FIG. 2, for players to enter predictions. The listing may include a brief descriptive snippet of the film and a link to the other pages that explain how to play the game plus any necessary legal notifications.

The listed titles may be a list of "Hot 5!" films—representing the top wide release films and major holdovers, which may be listed in alphabetical order. Players will preferably be able to enter the predicted weekend box office in millions in the form element, to one decimal point. Thus, $21,100,000 would be represented as $21.1 M. Once a player is satisfied with his/her entries he/she will press a Play or other button, which will communicate the predictions to the system 100.

Various point schemes may be used in scoring players performance. In one embodiment, a listing of movie pairs may be communicated to players, e.g., 5 movie pairs. Players may thereafter predict which of the two movie pairs had or will have a greater box office revenue, e.g., for the opening weekend. Each selection is preferably time so that the player has a limited amount of time, e.g., 20 seconds, to select one of each of the communicated pair. After each selection of one of the movie pairs, the next of the movie pair may be communicated and/or displayed in succession for the player's selection. Alternatively, instead of selecting one of two movie pairs, players may be asked to select a certain number, e.g., 5, of the top films based on opening or other weekend revenues. Total score may, in these instances, be the total of the correct selections for a session or multiple sessions.

Figure 3:
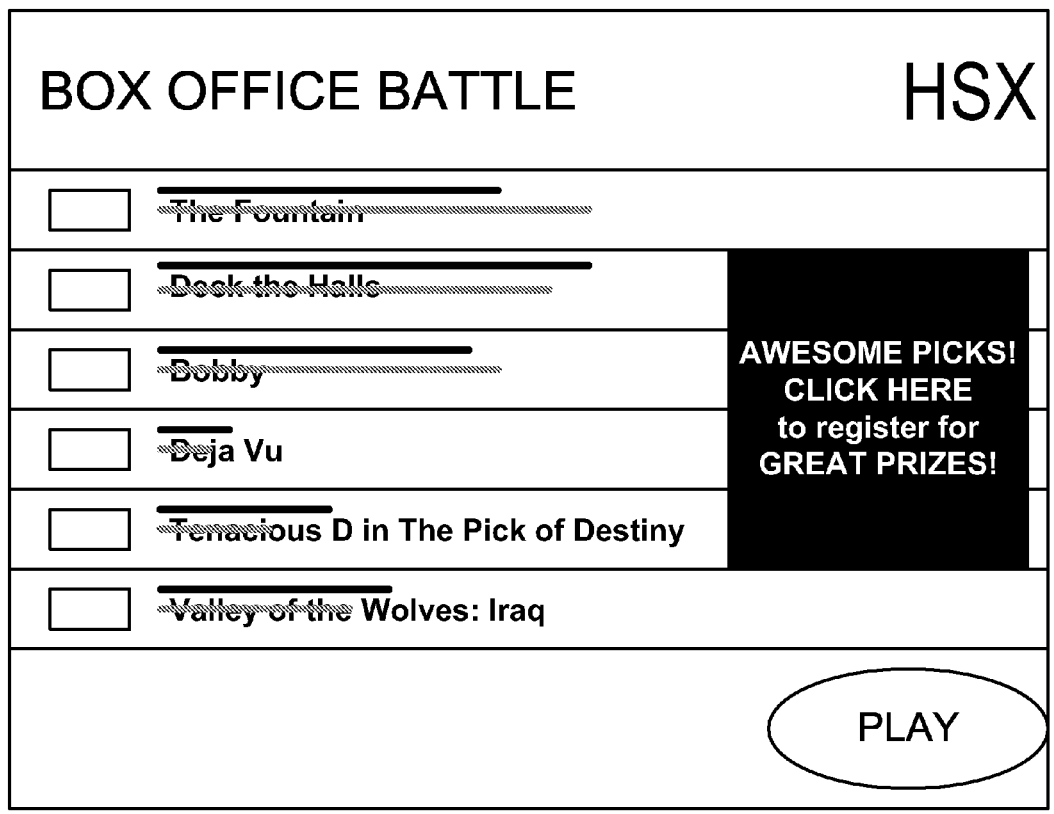
Figure 4:

In one embodiment, a database or other application may then be used to create remotely a unique identifier for the player and store that identifier in a cookie or other data file on the player's computer. The unique identifier is preferably computer generated, without any direct involvement from the player. That is, the unique identifier may be randomly generated by the system 100. Additionally, the system 100 may generate the unique identifier using player specific data as a seed or otherwise. For example, a mac address or IP address assigned to a client computer associated with the unregistered user may be set as the unique ID or used as a basis for the unique ID. The unique identifier may later be used to check the results of the game. That is, the unique identifier may be used to query a game database for the particular player's latest predictions and the results of any previous predictions. Prior to the close of the game, the results of the query may be used to populate an interface screen that compares the player's predictions to that of the current average of other player's predictions, as shown in FIG. 3. When the player returns to the site the following week, following the close of the game, the player may be shown an interface screen with the results of previous predictions shown therein, such as the screen shown in FIG. 4, which includes a comparison of the player's prediction to the actual box office value. FIG. 4 may generally be used for casual players who have not registered, which may display an hit or miss, or other note indicating whether or not the particular player predicted a value within a certain range to be considered a hit, e.g., such as +/−1%, 2%, . . . , 25%.

A game that does not require a log in, i.e., relying on cookies to track player activity, has technical considerations. First, players that do not accept cookies or that delete them will either be unable to play the game or see their results without registration. Second, players who log in from a computer different from the one they made their predictions on will not be able to see their results. Therefore, registered gameplay may be desired by certain players. Registration generally entails having the player set a login ID and password, which may be used to query the database for player specific data, such as latest predictions and the results of any previous predictions. Moreover, registered players may be directed to a page that contains additional information, such as a Leader Board that includes a listing of players from the plurality of players that are participating in playing the game with best scores for the week or cumulative for a period of time and the player's overall or total score. In certain embodiments, players may be given an opportunity to exchange points for a prize or similar benefits. Therefore, registered players may be directed to a page that provides a prize status and form and other elements for the player to exchange points for prizes. The interface may further include a "research" link that directs registered or other players to content on HSX.com or another research site or sites that may assist the players in their predictions. The research site(s) may provide news, reviews and interviews from content providers, plus estimates from the HSX prediction market and links to associated HSX MovieStock® pages.

The registration process will preferably be a brief process that meets TRUSTe standards for use of Personally Identifiable Information (PII). Registration may be limited to those age 13 and over. Other age restrictions may be applied, if necessary, to meet prize or advertising sponsor requirements. Registered players may also be able to track their picks from week to week, compare their weekly and seasonal totals against other players, communicate with other players via posting boards, and participate in any prize offerings.

While the foregoing invention has been described in some detail for purposes of clarity and understanding, it will be appreciated by one skilled in the art, from a reading of the disclosure, that various changes in form and detail can be made without departing from the true scope of the invention in the appended claims.

What is claimed is:

1. A method comprising:
receiving, via a processor, at least two predictions for a box office performance for at least one film, in which the at least two predictions are submitted by a registered player and an unregistered player of a game;
computing, via the processor, an actual box office earning for the at least one film;
computing, via the processor, a percentage by which each prediction is within the actual box office earning;
assigning, via the processor based on the computed percentage, a first quantity of points and at least one prize to the registered user;
assigning, via the processor based on the computed percentage, a second quantity of points to the unregistered user, in which the unregistered user is not permitted to receive a prize; and
transmitting to a remote device, via the processor, an indication that the at least one prize has been assigned to the registered player, in which the remote device and the processor are in electronic communication over a network.

2. The method of claim 1, in which the unregistered player is provided limited privileges in playing the game.

3. The method of claim 1, in which the registered player is provided full privileges in playing the game.

4. The method of claim 3 further comprising:
requesting that the registered player enter an unique user name before providing full privileges.

5. The method of claim 1, in which at least one bonus point is awarded for an exact match between a prediction and the actual box office earning.

6. The method of claim 1 further comprising:
determining, based on an overall score of the registered user, that the registered user qualifies a to be listed on a leader board.

7. The method of claim 1 further comprising:
providing a research link that corresponds to content that assists in the at least two predictions.

8. The method of claim 1 further comprising:
receiving a request to view at least one result from a previous prediction.

9. The method of claim 8 further comprising:
determining that the request to view is submitted by a registered player; and
transmitting the at least one result from the previous prediction.

10. An article of manufacture comprising:
a tangible, non-transitory storage medium, in which the storage medium stores instructions which, when executed by a processor, direct the processor to:
receive at least two predictions for a box office performance for at least one film, in which the at least two predictions are submitted by a registered player and an unregistered player of a game;
compute an actual box office earning for the at least one film;
compute a percentage by which each prediction is within the actual box office earning;
assign, based on the computed percentage, a first quantity of points and at least one prize to the registered user;
assign, based on the computed percentage, a second quantity of points to the unregistered user, in which the unregistered user is not permitted to receive a prize; and
transmit an indication that the at least one prize has been assigned to the registered player.

11. The article of manufacture of claim 10, in which the unregistered player is provided limited privileges in playing the game.

12. The article of manufacture of claim 10, in which the registered player is provided full privileges in playing the game.

13. The article of manufacture of claim 12, in which the storage medium stores instructions which, when executed by a processor, direct the processor to:
requesting that the registered player enter an unique user name before providing full privileges.

14. The article of manufacture of claim 10, in which at least one bonus point is awarded for an exact match between a prediction and the actual box office earning.

15. The article of manufacture of claim 10, in which the storage medium stores instructions which, when executed by a processor, direct the processor to:
determine, based on an overall score of the registered player, that the registered player qualifies to be listed on a leader board.

16. The article of manufacture of claim 10, in which the storage medium stores instructions which, when executed by a processor, direct the processor to:
provide a research link that corresponds to content that assists in the at least two predictions.

17. The article of manufacture of claim 10, in which the storage medium stores instructions which, when executed by a processor, direct the processor to:
receive a request to view at least one result from a previous prediction.

18. The article of manufacture of claim 17, in which the storage medium stores instructions which, when executed by a processor, direct the processor to:
determine that the request to view is submitted by a registered player; and
transmit the at least one result from the previous prediction.

* * * * *